United States Patent
Hao et al.

(10) Patent No.: US 12,483,369 B2
(45) Date of Patent: Nov. 25, 2025

(54) SIGNAL QUALITY INFORMATION OBTAINING METHOD, DEVICE, AND SYSTEM

(71) Applicant: HUAWEI TECHNOLOGIES CO., LTD., Guangdong (CN)

(72) Inventors: Jinping Hao, Shanghai (CN); Yinghao Jin, Boulogne Billancourt (FR)

(73) Assignee: Huawei Technologies Co., Ltd., Shenzhen (CN)

(*) Notice: Subject to any disclaimer, the term of this patent is extended or adjusted under 35 U.S.C. 154(b) by 397 days.

(21) Appl. No.: 17/883,852

(22) Filed: Aug. 9, 2022

(65) Prior Publication Data

US 2022/0385428 A1    Dec. 1, 2022

Related U.S. Application Data

(63) Continuation of application No. PCT/CN2020/074664, filed on Feb. 10, 2020.

(51) Int. Cl.
*H04W 72/04* (2023.01)
*H04L 5/00* (2006.01)
(Continued)

(52) U.S. Cl.
CPC .......... *H04L 5/0051* (2013.01); *H04L 5/0053* (2013.01); *H04W 24/08* (2013.01); *H04W 36/302* (2023.05); *H04W 36/087* (2023.05)

(58) Field of Classification Search
CPC ... H04L 5/0051; H04L 5/0053; H04L 5/0023; H04L 5/005; H04L 5/0094; H04W 24/08;
(Continued)

(56) References Cited

U.S. PATENT DOCUMENTS

2015/0055630 A1    2/2015  Attar et al.
2015/0163719 A1*   6/2015  Lim ................. H04W 36/0058
                                                      455/438
(Continued)

FOREIGN PATENT DOCUMENTS

CN    110557813 A    12/2019
CN    111742609 A    10/2020
EP      3462783 A1    4/2019

OTHER PUBLICATIONS

Extended European Search Report in European Appln No. 20918263.3, dated Dec. 22, 2022, 10 pages.
(Continued)

*Primary Examiner* — Maharishi V Khirodhar
(74) *Attorney, Agent, or Firm* — Fish & Richardson P.C.

(57) ABSTRACT

Embodiments of this disclosure provide a signal quality information obtaining method, a device, and a system. One example method includes: a source network device obtains configuration information of an SRS of a terminal device and sends the configuration information of the SRS to a target network device and the terminal device. A first cell of the target network device monitors the SRS based on the configuration information of the SRS, and then the target network device sends, to the source network device, signal quality information of the SRS detected by the first cell. Correspondingly, the source network device receives, from the target network device, the signal quality information of the SRS detected by the first cell, where the first cell is a cell controlled by the target network device, the first cell is an energy-saving cell, and the energy-saving cell is a cell that does not send an SSB.

20 Claims, 6 Drawing Sheets

(51) Int. Cl.
*H04W 24/08* (2009.01)
*H04W 36/30* (2009.01)
*H04W 76/00* (2018.01)
*H04W 88/08* (2009.01)
*H04W 36/08* (2009.01)

(58) Field of Classification Search
CPC ............ H04W 36/302; H04W 36/087; H04W 52/0245; H04W 36/0085; H04W 52/0258; H04B 7/04; Y02D 30/70
USPC .......................................................... 370/329
See application file for complete search history.

(56) References Cited

U.S. PATENT DOCUMENTS

2020/0305094 A1* 9/2020 Ouchi ................. H04W 52/325
2022/0110076 A1* 4/2022 Shimoda ........... H04W 72/0446

OTHER PUBLICATIONS

Intel Corporation, "Analysis of UL vs DL Measurement for connected state," 3GPP TSG RAN WG2 Meeting #95bis, R2-166889, Kaohsiung, Oct. 10-15, 2016, 5 pages.
PCT International Search Report and Written Opinion issued in International Application No. PCT/CN2020/074664 on Oct. 29, 2020, 15 pages (with English translation).
ZTE, "Motivation on NR RRM requirements enhancement," 3GPP TSG RAN Meeting #83, RP-190212, Shenzhen, China, Mar. 18-21, 2019, 6 pages.
ZTE, "Motivation on NR RRM requirements enhancement," 3GPP TSG RAN4 Meeting #90bis, R4-1904277, Xi'an, China, Apr. 8-12, 2019, 6 pages.

* cited by examiner

SIGNAL QUALITY INFORMATION OBTAINING METHOD, DEVICE, AND SYSTEM

CROSS-REFERENCE TO RELATED APPLICATIONS

This application is a continuation of International Application No. PCT/CN2020/074664, filed on Feb. 10, 2020. The disclosure of which is hereby incorporated by reference in its entirety.

TECHNICAL FIELD

Embodiments of this disclosure relate to the communication field, and in particular, to a signal quality information obtaining method, a device, and a system.

BACKGROUND

In a handover procedure of a mobile communication system, as shown in FIG. 1, after determining a target cell, a source base station sends a handover request to a target base station to which the target cell belongs. If the target base station allows a terminal device to access the target cell, the target base station sends a handover request acknowledgment to the source base station, where the handover request acknowledgment carries related information used to access the target cell. Then, the source base station sends a handover command to the terminal device, where the handover command carries the related information that is from the target base station and that is used to access the target cell. After receiving the handover command, the terminal device performs random access (RA) in the target cell based on the related information carried in the handover command.

Currently, the source base station determines the target cell mainly based on signal quality information that is reported by the terminal device and that is measured for a neighboring cell of a serving cell of the terminal device, and the signal quality information of the neighboring cell is obtained by the terminal device through measurement based on a signal such as a synchronization signal (SS)/physical broadcast channel (PBCH) block (SSB) corresponding to the neighboring cell.

However, if the base station does not send an SSB corresponding to a cell controlled by the base station, the terminal device cannot obtain signal quality information of the cell through measurement. Consequently, the source base station cannot obtain the signal quality information of the cell, and cannot control, based on the signal quality information of the cell, the terminal device to perform handover.

SUMMARY

Embodiments of this disclosure provide a signal quality information obtaining method, a device, and a system, so that when a target network device does not send an SSB of a first cell controlled by the target network device, a source network device can obtain signal quality information of the first cell, and the source network device can perform handover-related processing based on the signal quality information of the first cell.

To achieve the foregoing objectives, the following technical solutions are used in embodiments of this disclosure.

According to a first aspect, a signal quality information obtaining method and a corresponding apparatus are provided. In this solution, a source network device obtains configuration information of a sounding reference signal SRS of a terminal device, and sends the configuration information of the SRS to a target network device and the terminal device, where the configuration information of the SRS is used to configure a resource used by the terminal device to send the SRS, and is used to configure the target network device to monitor the SRS on the resource; and the source network device receives signal quality information of the SRS detected by a first cell of the target network device from the target network device, where the first cell is a cell controlled by the target network device, the first cell is an energy-saving cell, and the energy-saving cell is a cell that does not send an SSB.

Based on this solution, because the source network device sends the configuration information of the SRS of the terminal device to the target network device, the first cell of the target network device can monitor the SRS, and send, to the source network device, the signal quality information of the SRS detected by the first cell, so that the source network device obtains the signal quality information of the first cell, and the source network device can control, based on the signal quality information, the terminal device to perform handover.

In a possible design, that a source network device obtains configuration information of an SRS of a terminal device includes: the source network device determines the configuration information of the SRS of the terminal device; or the source network device receives, from a first network device, configuration information that is of the SRS of the terminal device and that is determined by the first network device, where the first network device may be a network controller.

In a possible design, the signal quality information obtaining method further includes: the source network device determines the first cell as a target cell based on the signal quality information of the SRS detected by the first cell.

Based on this solution, the source network device can determine the target cell based on the signal quality information of the SRS detected by the first cell, so that the source network device determines that the terminal device may be handed over to the first cell.

In a possible design, the signal quality information obtaining method further includes: the source network device sends a first message to the target network device, where the first message is used to request to hand over the terminal device to the first cell; and the source network device receives a second message from the target network device, where the second message is used to indicate that the terminal device is allowed to hand over to the first cell.

Based on this solution, for one thing, the source network device can control the terminal device to hand over to the first cell, so that the terminal device can hand over to the cell that originally does not send the SSB. For another, when the target network device is connected to the source network device through a wired interface, the target network device may send the signal quality information of the first cell to the source network device through the wired interface, so that the source network device performs handover decision. Therefore, the energy-saving cell does not need to send the SSB, and the terminal device does not need to measure the SSB through a wireless interface and does not need to report the signal quality information to the source network device to perform the handover decision. This reduces overheads of air interface resources.

In a possible design, the first message is a handover request message.

In a possible design, the second message is a handover request acknowledgment message.

In a possible design, the source network device is an ng-eNB or a next-generation base station gNB.

In a possible design, the source network device is a centralized unit (CU). In this case, the actions of the source network device in the implementations of the first aspect may be implemented by the CU.

According to a second aspect, a signal quality information obtaining method and a corresponding apparatus are provided. In this solution, a target network device receives configuration information of a sounding reference signal (SRS) of a terminal device from a source network device, and a first cell of the target network device monitors the SRS based on the configuration information of the SRS, where the first cell is a cell controlled by the target network device, the first cell is an energy-saving cell, and the energy-saving cell is a cell that does not send an SSB; and the target network device sends, to the source network device, signal quality information of the SRS detected by the first cell. For technical effects brought by the second aspect, refer to the technical effects brought by the first aspect. Details are not described herein again.

In a possible design, the signal quality information obtaining method further includes: the target network device receives a first message from the source network device, where the first message is used to request to hand over the terminal device to the first cell; and the target network device sends a second message to the source network device, where the second message is used to indicate that the terminal device is allowed to hand over to the first cell.

In a possible design, the signal quality information obtaining method further includes: the first cell of the target network device sends a synchronization signal/physical broadcast channel block SSB.

In a possible design, the first message is a handover request message.

In a possible design, the second message is a handover request acknowledgment message.

In a possible design, the target network device is a next-generation base station gNB.

In a possible design, the target network device is a centralized unit (CU) or a distributed unit (DU). In this case, the actions of interaction between the target network device and the source network device in the implementations of the second aspect may be implemented by the CU, and the actions of the first cell of the target network device may be implemented by the DU.

According to a third aspect, a signal quality information obtaining method and a corresponding apparatus are provided. In this solution, a source network device obtains configuration information of a sounding reference signal (SRS) of a terminal device; and the source network device sends the configuration information of the SRS to a target network device and the terminal device, where the configuration information of the SRS is used to configure a resource used by the terminal device to send the SRS, and is used to configure the target network device to monitor the SRS on the resource; and the source network device receives signal quality information that is of a synchronization signal/physical broadcast channel block SSB of a first cell and that is from the terminal device, where the first cell is a cell controlled by a target network device, the first cell is an energy-saving cell, the energy-saving cell is a cell that does not send an SSB, and a second cell is any cell controlled by the target network device.

Based on this solution, because the source network device sends the configuration information of the SRS of the terminal device to the target network device, the second cell of the target network device can monitor the SRS, and send the SSB of the first cell when the second cell detects the SRS, so that the terminal device can obtain the signal quality information of the SSB of the first cell, and report the signal quality information of the SSB of the first cell to the source network device. Therefore, the source network device can obtain the signal quality information of the first cell, and perform handover based on the signal quality information of the first cell.

In a possible design, the signal quality information obtaining method further includes: The source network device determines the first cell as a target cell based on the signal quality information of the SSB of the first cell.

Based on this solution, for one thing, the source network device can determine the target cell based on the signal quality information of the SSB of the first cell, so that the source network device determines that the terminal device may be handed over to the first cell. For another, after the second cell detects the SRS, the energy-saving cell can send the SSB, so that the terminal device can report a measurement result to the source network device by using an existing standard measurement and reporting mechanism. Therefore, the source network device can perform handover decision. This is better compatible with an existing standard procedure.

In a possible design, the signal quality information obtaining method further includes: the source network device sends a first message to the target network device, where the first message is used to request to hand over the terminal device to the first cell; and the source network device receives a second message from the target network device, where the second message is used to indicate that the terminal device is allowed to hand over to the first cell.

In a possible design, the first message is a handover request message.

In a possible design, the second message is a handover request acknowledgment message.

In a possible design, the source network device is an ng-eNB or a next-generation base station gNB.

In a possible design, the source network device is a centralized unit CU. In this case, the actions of the source network device in the implementations of the third aspect may be implemented by the CU.

According to a fourth aspect, a signal quality information obtaining method and a corresponding apparatus are provided. In this solution, a target network device receives configuration information of a sounding reference signal (SRS) of a terminal device from a source network device, and a second cell of the target network device monitors the SRS based on the configuration information of the SRS; and when signal quality that is of the second cell and that is indicated by signal quality information of the SRS detected by the second cell of the target network device is greater than or equal to a second threshold, a first cell of the target network device sends a synchronization signal/physical broadcast channel block (SSB), where the first cell is a cell controlled by the target network device, the first cell is an energy-saving cell, and the energy-saving cell is a cell that does not send an SSB. For technical effects brought by the fourth aspect, refer to the technical effects brought by the third aspect. Details are not described herein again.

In a possible design, the signal quality information obtaining method further includes: the target network device receives a first message from the source network device, where the first message is used to request to hand over the terminal device to the first cell; and the target network device sends a second message to the source network device, where the second message is used to indicate that the terminal device is allowed to hand over to the first cell.

In a possible design, the first message is a handover request message.

In a possible design, the second message is a handover request acknowledgment message.

In a possible design, the target network device is a next-generation base station (gNB).

In a possible design, the target network device is a centralized unit (CU) or a distributed unit (DU). In this case, the actions of interaction between the target network device and the source network device in the implementations of the fourth aspect may be implemented by the CU, and the actions of the first cell or the second cell of the target network device may be implemented by the DU.

According to a fifth aspect, a signal quality information obtaining method and a corresponding apparatus are provided. In this solution, a source network device receives signal quality information and first beam information that are of a first synchronization signal/physical broadcast channel block (SSB) of a third cell and that are from a terminal device, where the third cell is a cell controlled by a target network device, and a beam indicated by the first beam information is used to carry the first SSB of the third cell; the source network device determines the third cell as a target cell based on the signal quality information of the first SSB of the third cell; the source network device sends a first message to the target network device, where the first message includes the signal quality information and the first beam information of the first SSB of the third cell; and the source network device receives a second message from the target network device, where the second message is used to indicate that the terminal device is allowed to hand over to the first cell, the first cell is a cell controlled by the target network device, the first cell is an energy-saving cell, the energy saving cell is a cell that does not send an SSB, and an overlapping part exists between a coverage area of the first cell and a coverage area of the third cell.

Based on this solution, the target network device can determine, based on the signal quality information and the beam information that are of the SSB of the third cell and that are obtained by the terminal device through measurement, that the terminal device is allowed to hand over to the first cell, and indicate, to the source network device, that the terminal device is allowed to hand over to the first cell, so that the source network device can control the terminal device to hand over to the first cell.

In a possible design, the second message includes an identifier of the first cell and/or configuration information of a synchronization signal/physical broadcast channel block (SSB) of the first cell.

In a possible design, the first message is a handover request message.

In a possible design, the second message is a handover request acknowledgment message.

In a possible design, the source network device is an ng-eNB or a next-generation base station (gNB).

In a possible design, the source network device is a centralized unit (CU). In this case, the actions of the source network device in the implementations of the fifth aspect may be implemented by the CU.

According to a sixth aspect, a signal quality information obtaining method and a corresponding apparatus are provided. In this solution, a target network device receives a first message from a source network device, where the first message includes signal quality information and first beam information of a first SSB of a third cell, the third cell is a cell controlled by the target network device, and a beam indicated by the first beam information is used to carry the first SSB of the third cell; the target network device determines, based on the signal quality information and the first beam information of the first SSB of the third cell, that a terminal device is allowed to hand over to a first cell, where the first cell is a cell controlled by the target network device, and an overlapping part exists between a coverage area of the first cell and a coverage area of the third cell; and the target network device sends a second message to the source network device, where the second message is used to indicate that the terminal device is allowed to hand over to the first cell.

Based on this solution, the target network device can determine, based on the signal quality information and the beam information of the SSB of the third cell, that the terminal device is allowed to hand over to the first cell, and indicate, to the source network device, that the terminal device is allowed to hand over to the first cell, so that the source network device can control the terminal device to hand over to the first cell.

In a possible design, that the target network device determines, based on the signal quality information and the first beam information of the first SSB of the third cell, that a terminal device is allowed to hand over to a first cell includes: The target network device estimates, based on the signal quality information and the first beam information of the first SSB of the third cell, a location of the terminal device; and the target network device determines, based on the location of the terminal device, that the terminal device is allowed to hand over to the first cell.

In a possible design, the second message includes an identifier of the first cell and/or configuration information of a synchronization signal/physical broadcast channel block (SSB) of the first cell.

In a possible design, the signal quality information obtaining method further includes: The first cell of the target network device sends an SSB.

In a possible design, the first message is a handover request message.

In a possible design, the second message is a handover request acknowledgment message.

In a possible design, the target network device is a next-generation base station (gNB).

In a possible design, the target network device is a centralized unit (CU) or a distributed unit (DU). In this case, the actions of interaction between the target network device and the source network device in the implementations of the sixth aspect may be implemented by the CU, and the actions of the first cell or the third cell of the target network device may be implemented by the DU.

According to a seventh aspect, a communication apparatus is provided, to implement the foregoing methods. The communication apparatus may be the source network device in the first aspect, the third aspect, or the fifth aspect, an apparatus including the source network device, or an apparatus included in the source network device. Alternatively, the communication apparatus may be the target network device in the second aspect, the fourth aspect, or the sixth aspect, an apparatus including the target network device, or an apparatus included in the target network device. The communication apparatus includes corresponding modules, units, or means for implementing the foregoing methods. The modules, units, or means may be implemented by hardware, software, or hardware by executing corresponding software. The hardware or the software includes one or more modules or units corresponding to the foregoing functions.

According to an eighth aspect, a communication apparatus is provided, including a processor and a memory, where the memory is configured to store computer instructions. When the processor executes the instructions, the communication apparatus is enabled to perform the method according to any one of the foregoing aspects. The communication apparatus may be the source network device in the first aspect, the third aspect, or the fifth aspect, an apparatus including the source network device, or an apparatus included in the source network device. Alternatively, the communication apparatus may be the target network device in the second aspect, the fourth aspect, or the sixth aspect, an apparatus including the target network device, or an apparatus included in the target network device.

According to a ninth aspect, a communication apparatus is provided. The communication apparatus includes a processor. The processor is configured to: be coupled to a memory, and after reading instructions in the memory, perform the method according to any one of the foregoing aspects according to the instructions. The communication apparatus may be the source network device in the first aspect, the third aspect, or the fifth aspect, an apparatus including the source network device, or an apparatus included in the source network device. Alternatively, the communication apparatus may be the target network device in the second aspect, the fourth aspect, or the sixth aspect, an apparatus including the target network device, or an apparatus included in the target network device.

According to a tenth aspect, a communication apparatus is provided. The communication apparatus includes a processor and an interface circuit. The interface circuit may be a code/data read/write interface circuit, and the interface circuit is configured to: receive computer-executable instructions (where the computer-executable instructions are stored in a memory, and may be directly read from the memory or may be read through another component), and transmit the computer-executable instructions to the processor. The processor is configured to run the computer-executable instructions to perform the method according to any one of the foregoing aspects. The communication apparatus may be the source network device in the first aspect, the third aspect, or the fifth aspect, an apparatus including the source network device, or an apparatus included in the source network device. Alternatively, the communication apparatus may be the target network device in the second aspect, the fourth aspect, or the sixth aspect, an apparatus including the target network device, or an apparatus included in the target network device.

According to an eleventh aspect, a computer-readable storage medium is provided. The computer-readable storage medium stores instructions. When the instructions are run on a computer, the computer is enabled to perform the method according to any one of the foregoing aspects.

According to a twelfth aspect, a computer program product including instructions is provided. When the computer program product runs on a computer, the computer is enabled to perform the method according to any one of the foregoing aspects.

According to a thirteenth aspect, a communication apparatus (where for example, the communication apparatus may be a chip or a chip system) is provided. The communication apparatus includes a processor, configured to implement a function in any one of the foregoing aspects. In a possible design, the communication apparatus further includes a memory, and the memory is configured to store necessary program instructions and data. When the communication apparatus is a chip system, the communication apparatus may include a chip, or may include the chip and another discrete component.

For technical effects brought by any design of the seventh aspect to the thirteenth aspect, refer to the technical effects brought by different designs of the first aspect, the second aspect, the third aspect, the fourth aspect, the fifth aspect, or the sixth aspect. Details are not described herein again.

According to a fourteenth aspect, a communication system is provided. The communication system includes the source network device described in the first aspect, the third aspect, or the fifth aspect and the target network device described in the second aspect, the fourth aspect, or the sixth aspect.

DESCRIPTION OF EMBODIMENTS

Figure 1:
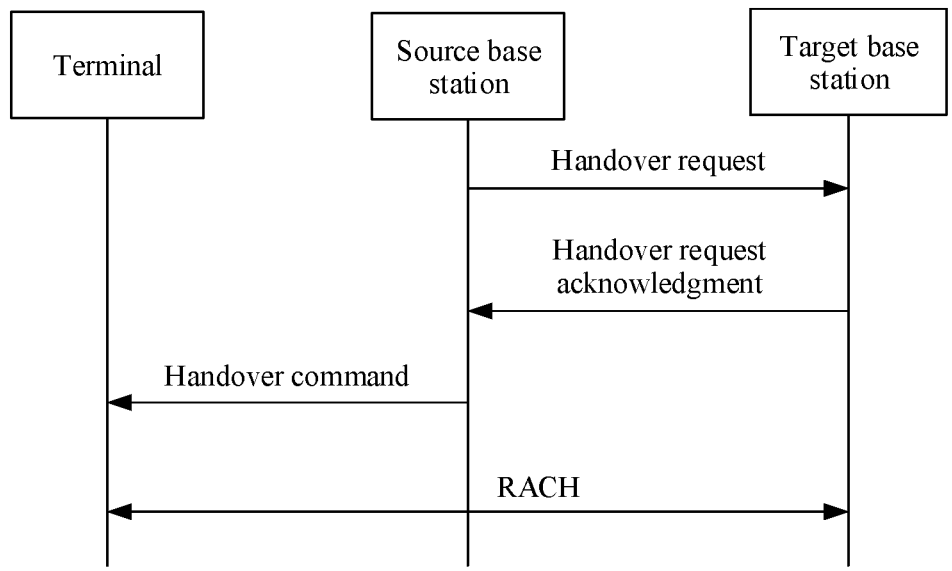
FIG. 1 is a schematic diagram of an existing handover process.

For ease of understanding technical solutions in embodiments of this disclosure, the following first briefly describes technologies or terms related to this disclosure.

I. Downlink Physical Channel

In a new radio (NR) system (namely, a 5th generation (5G) system), downlink physical channels are roughly classified into the following three types: a physical broadcast channel (PBCH), usually used to carry a system broadcast message; a physical downlink control channel (PDCCH), usually used to control transmission of signaling, for example, uplink and downlink scheduling signaling and power control signaling; and a physical downlink shared channel (PDSCH), usually used to carry downlink user data.

II. Physical Signal

In embodiments of this disclosure, the following several physical signals are mainly briefly described.

1. A primary synchronization signal (PSS)/secondary synchronization signal (SSS) is mainly used for time and frequency synchronization, initial beam selection, cell signal quality measurement, radio resource management (RRM) measurement, and the like.

The primary synchronization signal/secondary synchronization signal is usually referred to as a primary/secondary synchronization signal. Cell signal quality is mainly measured by using the SSS, and cell signal quality information may be indicated by using one or more of the following: reference signal received power (RSRP), reference signal received quality (RSRQ), and a reference signal-signal to interference and noise ratio (RS-SINR).

2. A synchronization signal/physical broadcast channel block (SSB) includes a PSS, an SSS, and a PBCH. The SSB is periodically sent, and occupies four orthogonal frequency division multiplexing (OFDM) symbols in time domain, and the symbols are numbered from 0 to 3 in ascending order. That is, the PSS, the SSS, and the PBCH are transmitted in four continuous OFDM symbols to form the SSB. The SSB occupies 20 resource blocks (RBs) in frequency domain.

3. A master information block (MIB) is a main broadcast information block carried in the PBCH of the SSB, and includes most important system information.

4. Remaining minimum system information (RMSI) RMSI may be understood as a system information block (SIB) 1, that is, a SIB1. The RMSI is necessary system information for a terminal device to access a cell. The RMSI is periodically sent, and a sending periodicity of the RMSI is the same as a periodicity of the SSB.

III. Cell Signal Quality Information

In embodiments of this disclosure, the cell signal quality information may be understood as signal quality information that is received by a terminal device and that is from an SSB of a cell of a network device, or may be understood as signal quality information that is received by a cell of a network device and that is from a sounding reference signal (SRS) of a terminal device, where the cell is a cell controlled by the network device.

The following describes the technical solutions in embodiments of this disclosure with reference to the accompanying drawings in embodiments of this disclosure. In descriptions of this disclosure, "/" represents an "or" relationship between associated objects unless otherwise specified. For example, A/B may represent A or B. In this disclosure, "and/or" describes only an association relationship for describing the associated objects and represents that three relationships may exist. For example, A and/or B may represent the following three cases: only A exists, both A and B exist, and only B exists, where A and B may be singular or plural. In addition, in the descriptions of this disclosure, "a plurality of" means two or more than two unless otherwise specified. "At least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural. In addition, to clearly describe the technical solutions in embodiments of this disclosure, words such as "first" and "second" are used in embodiments of this disclosure to distinguish between same items or similar items that have basically the same functions or purposes. A person skilled in the art may understand that the words such as "first" and "second" do not limit a quantity or an execution sequence, and the words such as "first" and "second" do not indicate a definite difference.

The technical solutions in embodiments of this disclosure may be applied to various communication systems, for example, an orthogonal frequency division multiple access (OFDMA) system, a single carrier frequency division multiple access (SC-FDMA) system, a 5G communication system, and other systems. Terms "system" and "network" can be interchanged with each other. The 5G communication system is a next-generation communication system under research. The 5G communication system includes a 5G non-standalone (NSA) mobile communication system, a 5G standalone (SA) mobile communication system, or both a 5G NSA mobile communication system and a 5G SA mobile communication system. In addition, the communication systems may be further applied to a future-oriented communication technology, and are all applicable to the technical solutions provided in embodiments of this disclosure. The foregoing communication systems applicable to this disclosure are merely examples for description, and communication systems applicable to this disclosure are not limited thereto. This is centrally described herein, and details are not described below.

Figure 2:
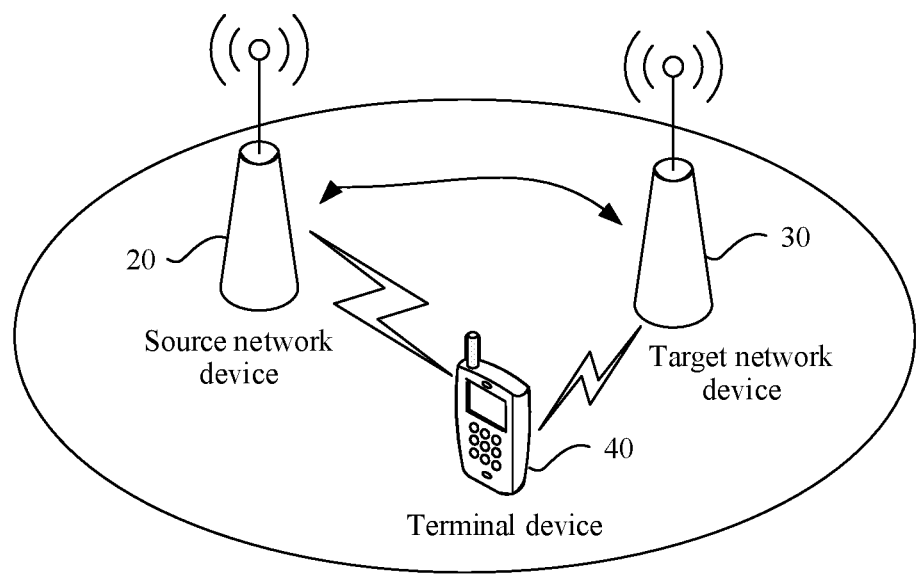
FIG. 2 is a schematic diagram of an architecture of a communication system according to an embodiment of this disclosure.

FIG. 2 shows a communication system according to an embodiment of this disclosure. The communication system includes a source network device 20 and a target network device 30, and a connection manner between the source network device 20 and the target network device 30 may be, for example, a wired connection or a wireless connection. This is not specifically limited in this embodiment of this disclosure. In FIG. 2, the wired connection is used as an example for description. Optionally, the communication system may further include a terminal device 40. In this embodiment of this disclosure, an example in which the terminal device 40 communicates with the source network device 20 before handover and communicates with the target network device 30 after handover is used for description.

Interaction between the source network device 20 and the target network device 30 shown in FIG. 2 is used as an example. In this embodiment of this disclosure, after determining configuration information of a sounding reference signal (SRS) corresponding to the terminal device, the source network device sends the configuration information of the SRS to the target network device. After the target network device receives the configuration information of the SRS from the source network device, a first cell monitors the SRS based on the configuration information of the SRS, and sends, to the source network device, signal quality information of the SRS detected by the first cell. Correspondingly, the source network device receives the signal quality information of the SRS detected by the first cell of the target network device, where the first cell is a cell controlled by the target network device, the first cell is an energy-saving cell, and the energy-saving cell is a cell that does not send an SSB.

Based on this solution, because the source network device sends, to the target network device, the configuration information of the SRS corresponding to the terminal device, the first cell of the target network device can monitor the SRS, and send the signal quality information of the SRS detected by the first cell to the source network device, so that the source network device obtains the signal quality information of the SRS detected by the first cell, and can perform handover-related processing based on the signal quality information of the SRS detected by the first cell.

Optionally, the terminal device 40 in this embodiment of this disclosure may be a device such as a terminal or a chip that may be used in the terminal, configured to implement a wireless communication function. The terminal may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device or a wearable device, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. The terminal may be mobile or fixed.

Optionally, the source network device 20 or the target network device 30 in this embodiment of this disclosure is a device for connecting the terminal device 40 to a wireless network, and may be an evolved NodeB (eNB or eNodeB) or a next-generation evolved NodeB (ng-eNB) in long term evolution (LTE), or a next-generation NodeB (gNB), a broadband network gateway (BNG), an aggregation switch or a non-3rd generation partnership project (3GPP) access device, or the like in a 5th generation (5G) network or a future evolved PLMN. This is not specifically limited in this embodiment of this disclosure. Optionally, a base station in this embodiment of this disclosure may include base stations in various forms, for example, a macro base station, a micro base station (which is also referred to as a small cell), a relay station, and an access point. This is not specifically limited in this embodiment of this disclosure.

Optionally, in a possible implementation, the source network device 20 or the target network device 30 in this embodiment of this disclosure may alternatively be a centralized unit (CU) or a distributed unit (DU). The source network device 20 or the target network device 30 may alternatively include a CU and a DU. It may be understood that a radio access network device is divided into the CU and the DU by logical functions. The CU and the DU may be physically separated, or may be deployed together. This is not specifically limited in this embodiment of this disclosure. The CU and the DU may be connected through an interface, for example, an F1 interface. The CU and the DU may be divided based on protocol layers of a wireless network. For example, functions of a radio resource control (RRC) protocol layer, a service data adaptation protocol (SDAP) protocol layer, and a packet data convergence protocol (PDCP) protocol layer are set in the CU, and functions of a radio link control (RLC) protocol layer, a media access control (MAC) protocol layer, a physical (PHY) protocol layer, and the like are set in the DU. It may be understood that, division into processing functions of the CU and the DU based on the protocol layers is merely an example, and the processing functions of the CU and the DU may alternatively be divided in another manner. This is not specifically limited in this embodiment of this disclosure.

Optionally, the CU may include a CU control plane (CU-CP) and a CU user plane (CU-UP). It may be understood that the CU is divided into the CU-CP and the CU-UP by logical functions. The CU-CP and the CU-UP may be divided based on protocol layers of a wireless network. For example, a function of the RRC protocol layer and a function that is of the PDCP protocol layer and that is corresponding to a signaling radio bearer (SRB) are set in the CU-CP, and a function that is of the PDCP protocol layer and that is corresponding to a data radio bearer (DRB) is set in the CU-UP. In addition, a function of the SDAP protocol layer may also be set in the CU-UP.

Optionally, the source network device 20, the target network device 30, and the terminal device 40 in this embodiment of this disclosure may also be referred to as a communication apparatus, and may be a general-purpose device or a dedicated device. This is not specifically limited in this embodiment of this disclosure.

Figure 3:
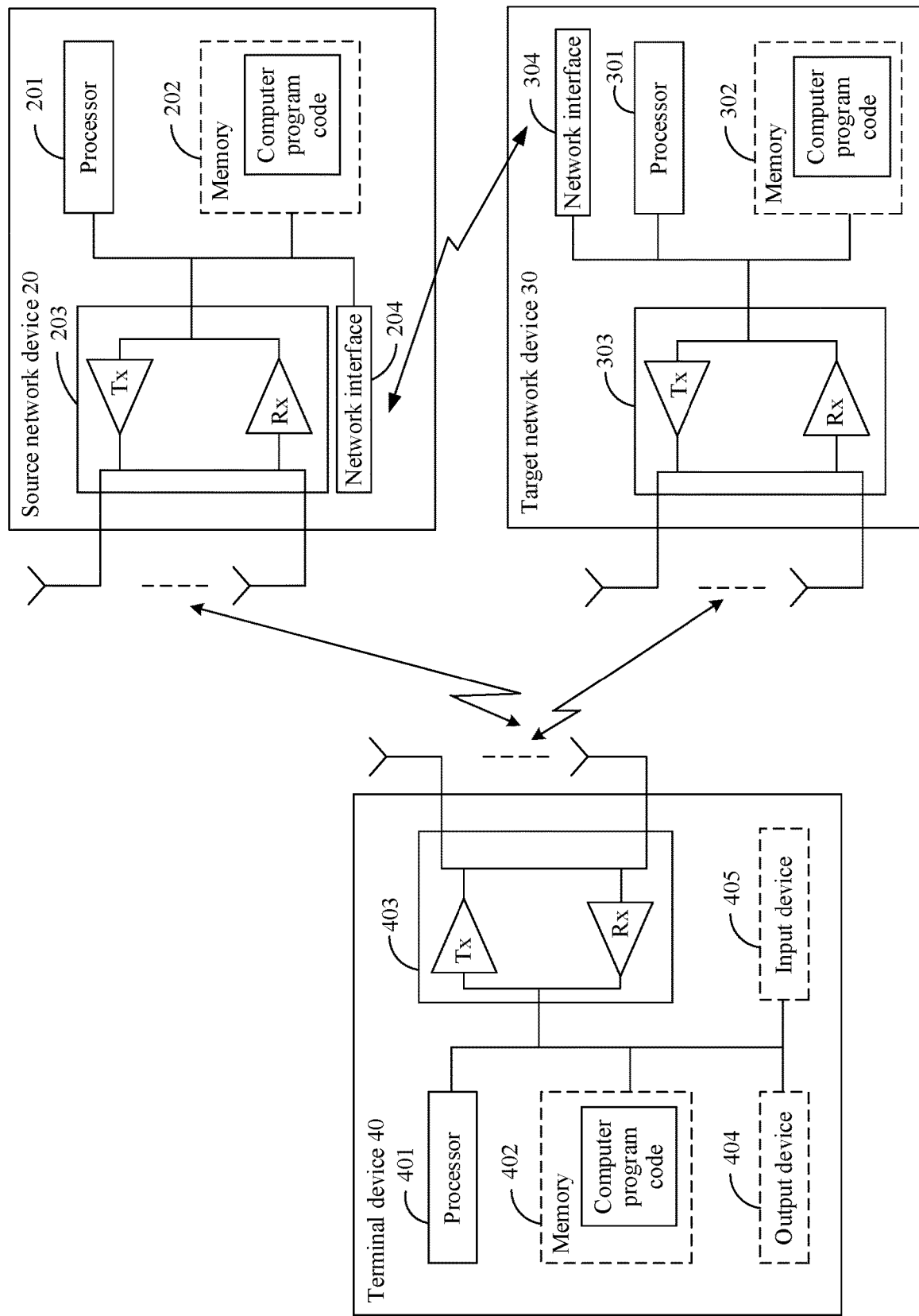
FIG. 3 is a schematic diagram of structures of a terminal device, a source network device, and a target network device according to an embodiment of this disclosure.

Optionally, FIG. 3 is a schematic diagram of structures of the source network device 20, the target network device 30, and the terminal device 40 according to an embodiment of this disclosure.

The terminal device 40 includes at least one processor (an example in which one processor 401 is included is used for description in FIG. 3) and at least one transceiver (an example in which one transceiver 403 is included is used for description in FIG. 3). Optionally, the terminal device may further include at least one memory (an example in which one memory 402 is included is used for description in FIG. 3), at least one output device (an example in which one output device 404 is included is used for description in FIG. 3), and at least one input device (an example in which one input device 405 is included is used for description in FIG. 3).

The processor 401, the memory 402, and the transceiver 403 are connected to each other through a communication line. The communication line may include a path transmitting information between the foregoing components.

The processor 401 may be a general-purpose central processing unit (CPU), a microprocessor, an disclosure-specific integrated circuit (ASIC), or one or more integrated circuits configured to control program execution of the solutions in this disclosure. In specific implementation, in an embodiment, the processor 401 may also include a plurality of CPUs, and the processor 401 may be a single-core processor (single-CPU) or a multi-core processor (multi-CPU). The processor herein may refer to one or more devices, circuits, or processing cores configured to process data (for example, computer program instructions).

The memory 402 may be an apparatus having a storage function. For example, the memory may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray optical disc, or the like), a magnetic disk storage medium or another magnetic storage device, or any other medium that can be used to carry or store expected program code in a form of an instruction structure or a data structure and that can be accessed by a computer, but is not limited thereto. The memory 402 may exist independently, and is connected to the processor 401 through the communication line. The memory 402 may alternatively be integrated with the processor 401.

The memory 402 is configured to store computer-executable instructions for performing the solutions in this disclosure, and the processor 401 controls execution of the computer-executable instructions. Specifically, the processor 401 is configured to execute the computer-executable instructions stored in the memory 402, to implement a signal quality information obtaining method in embodiments of this disclosure. Optionally, the computer-executable instructions in this embodiment of this disclosure may also be referred to as disclosure program code or computer program code. This is not specifically limited in this embodiment of this disclosure.

The transceiver 403 may use any apparatus such as a transceiver, and is configured to communicate with another device or a communication network such as the Ethernet, a radio access network (RAN), or a wireless local area network (WLAN). The transceiver 403 includes a transmitter (Tx) and a receiver (Rx). The transceiver may also be an input/output interface.

The output device 404 communicates with the processor 401, and may display information in a plurality of manners. For example, the output device 404 may be a liquid crystal display (LCD), a light emitting diode (LED) display device, a cathode ray tube (CRT) display device, a projector, or the like.

The input device 405 communicates with the processor 401, and may receive an input of a user in a plurality of manners. For example, the input device 405 may be a mouse, a keyboard, a touchscreen device, a sensing device, or the like.

The source network device 20 includes one or more processors (an example in which one processor 201 is included is used for description in FIG. 3), at least one transceiver (an example in which one transceiver 203 is included is used for description in FIG. 3), and at least one network interface (an example in which one network interface 204 is included is used for description in FIG. 3). Optionally, the source network device may further include at least one memory (an example in which one memory 202 is included is used for description in FIG. 3). The processor 201, the memory 202, the transceiver 203, and the network interface 204 are connected through a communications line. The network interface 204 is configured to connect to a core network device through a link (such as an S1 interface) (where the connection is not shown in FIG. 3), or connect to a network interface of another network device through a wired or wireless link (such as an X2 interface). This is not specifically limited in this embodiment of this disclosure. In addition, for related descriptions of the processor 201, the memory 202, and the transceiver 203, refer to the descriptions of the processor 401, the memory 402, and the transceiver 403 of the terminal device, and details are not repeated herein again.

The target network device 30 includes one or more processors (an example in which one processor 301 is included is used for description in FIG. 3), at least one transceiver (an example in which one transceiver 303 is included is used for description in FIG. 3), and at least one network interface (an example in which one network interface 304 is included is used for description in FIG. 3). Optionally, the target network device may further include at least one memory (an example in which one memory 302 is included is used for description in FIG. 3). The processor 301, the memory 302, the transceiver 303, and the network interface 304 are connected through a communication line. The network interface 304 is configured to connect to a core network device through a link (such as an S1 interface) (where the connection is not shown in FIG. 3), or connect to a network interface of another network device through a wired or wireless link (such as an X2 interface). This is not specifically limited in this embodiment of this disclosure. In addition, for related descriptions of the processor 301, the memory 302, and the transceiver 303, refer to the descriptions of the processor 401, the memory 402, and the transceiver 403 of the terminal device, and details are not repeated herein again.

With reference to the accompanying drawings, the following describes in detail the signal quality information obtaining method provided in embodiments of this disclosure by using interaction between the source network device 20 and the target network device 30 shown in FIG. 2 as an example.

It should be noted that names of messages between network elements, names of parameters in the messages, or the like in the following embodiments of this disclosure are merely examples, and there may be other names in a specific implementation. This is not specifically limited in this embodiment of this disclosure.

It may be understood that, in embodiments of this disclosure, interaction between the network device (including the source network device or the target network device) and the terminal device is also applicable to interaction between the CU and the terminal device, or interaction between the DU and the terminal device. Interaction between the source network device and the target network device is also applicable to interaction between the CUs. Further, when the network device includes the CU and the DU, interaction between the DU and the CU may also be included before the interaction between the CUs. For example, the source network device includes a first CU and a first DU, the target network device includes a second CU and a second DU, that the source network device sends a message 1 to the target network device may be that the first CU sends the message 1 to the second CU, or may be that the first DU sends the message 1 to the first CU, and after receiving the message 1 from the first DU, the first CU sends the message 1 to the second CU.

It may be understood that, in embodiments of this disclosure, an interaction mechanism between the network device and the terminal device may be properly transformed, to be applicable to the interaction between the CU or the DU and the terminal device, and an interaction mechanism between the source network device and the target network device may be properly transformed, to be applicable to the interaction between the CUs.

It should be noted that the first cell in embodiments of this disclosure is a cell controlled by the target network device. It is assumed that before the method provided in embodiments of this disclosure is performed, the first cell is an energy-saving cell, or the first cell is in an energy-saving state, and the energy-saving cell is a cell that does not send an SSB. In other words, before the method provided in embodiments of this disclosure is performed, the first cell of the target network device does not send an SSB. In this case, the terminal device cannot measure the SSB of the first cell and cannot report measurement information to the source network device, and the source network device cannot obtain signal quality information of the first cell based on reporting of the terminal device. The SSB sent by the first cell is used by the terminal device to synchronize with the first cell and receive information broadcast by the first cell. The SSB sent by the first cell may also be understood as an SSB of the first cell. In a process in which the method provided in embodiments of this disclosure is performed, the first cell of the target network device sends the SSB. In this case, a state of the first cell changes, that is, the first cell is in a non-energy saving state. When the first cell of the target network device starts to send the SSB or when the state of the first cell changes is described in detail in the following embodiments, and details are not described herein.

Figure 4:
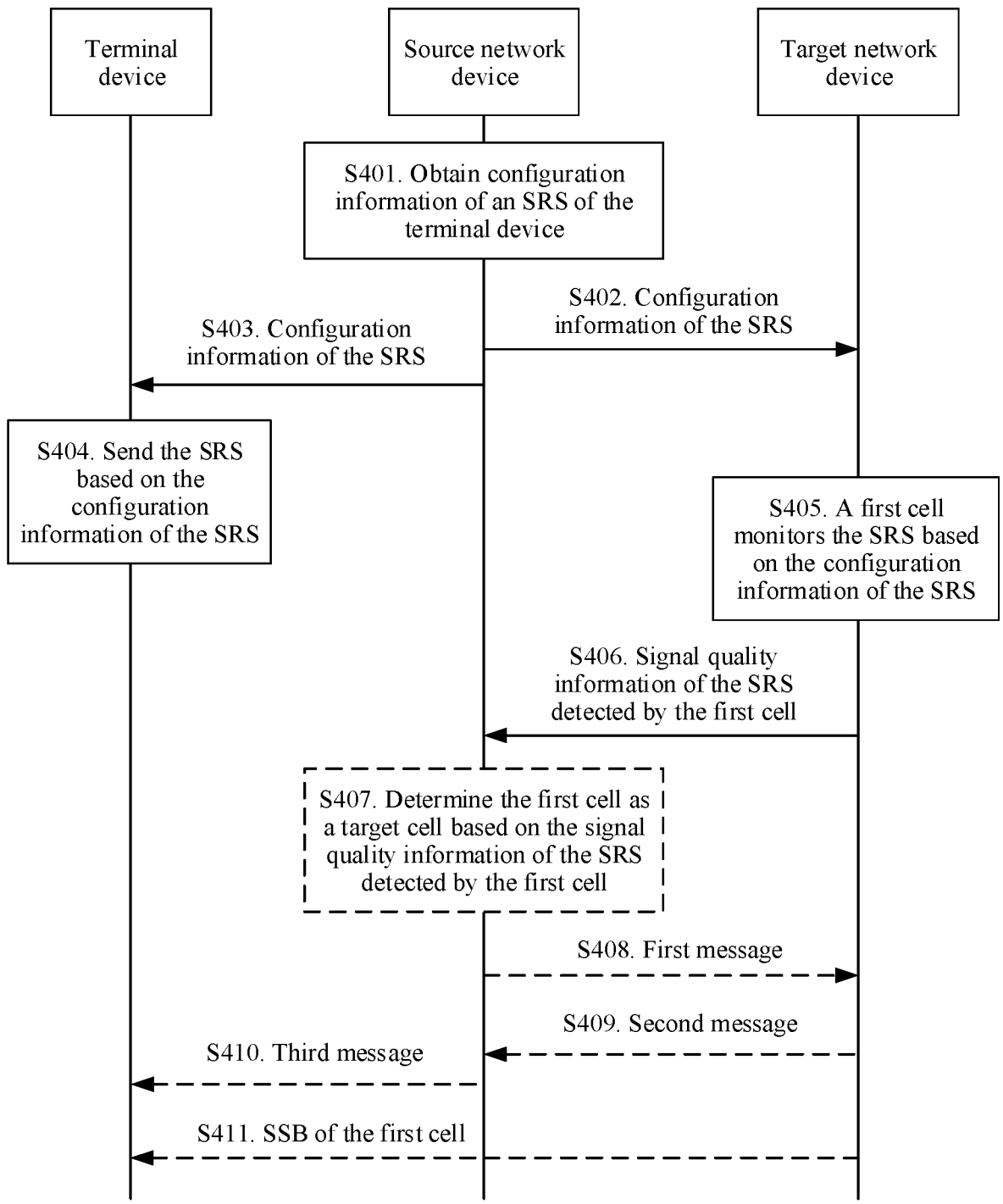
FIG. 4 is a schematic flowchart 1 of a signal quality information obtaining method according to an embodiment of this disclosure.

FIG. 4 shows a signal quality information obtaining method according to an embodiment of this disclosure. The signal quality information obtaining method includes the following operations.

S401. A source network device obtains configuration information of an SRS of a terminal device.

It should be noted that, in this embodiment of this disclosure, unless otherwise specified, the configuration information of the SRS is configuration information that is of the SRS of the terminal device and that is obtained by the source network device, and the SRS is an SRS sent by the terminal device. This is centrally described herein, and details are not described again in the following embodiments.

For example, that a source network device obtains configuration information of an SRS of a terminal device may include: the source network device may determine the configuration information of the SRS of the terminal device; or may include: the source network device receives determined configuration information that is of the SRS of the terminal device and that is from another network device (for example, a network controller). The configuration information of the SRS may include one or more of the following: periodicity information, time domain resource configuration information, frequency domain resource configuration information, a quantity of transmit antenna ports of the SRS, and the like. For example, the periodicity information is used to indicate a sending periodicity of the SRS, the time domain resource configuration information may include, for example, a start symbol location and a quantity of symbols, and the frequency domain resource configuration information may include, for example, a frequency domain location and a frequency offset.

S402. The source network device sends the configuration information of the SRS of the terminal device to a target network device. Correspondingly, the target network device receives the configuration information of the SRS of the terminal device from the source network device.

The configuration information of the SRS is used to configure a resource used by the terminal device to send the SRS, and is used to configure the target network device to monitor the SRS on the resource.

It may be understood that, to enable the target network device to detect the SRS sent by the terminal device, the source network device further needs to configure the terminal device to send the SRS. Therefore, the signal quality information obtaining method provided in this embodiment of this disclosure may further include the following operations S403 and S404.

S403. The source network device sends the configuration information of the SRS to the terminal device. Correspondingly, the terminal device receives the configuration information of the SRS from the source network device.

It should be understood that, in this embodiment of this disclosure, there is no strict execution sequence for operation S402 and operation S403, operation S402 may be performed before operation S403, operation S403 may be performed before operation S402, or operation S402 and operation S403 may be simultaneously performed. This is not specifically limited in this embodiment of this disclosure.

Optionally, after receiving the configuration information of the SRS, the terminal device may send the SRS based on the configuration information of the SRS, that is, perform the following operation S404.

S404. The terminal device sends the SRS based on the configuration information of the SRS.

Optionally, when the configuration information of the SRS includes the periodicity information, that the terminal device sends the SRS based on the configuration information of the SRS may be that, for example, the terminal device periodically sends the SRS based on the periodicity information.

S405. A first cell of the target network device monitors the SRS based on the configuration information of the SRS.

The first cell is a cell controlled by the target network device. The first cell may be understood as a neighboring cell of a current serving cell of the terminal device. In operation S405, the first cell is an energy-saving cell, or the first cell is in an energy-saving state.

Optionally, when the first cell of the target network device monitors the SRS based on the configuration information of the SRS, and detects the SRS, the following operation S406 is performed.

It should be noted that, in this embodiment of this disclosure, that the first cell of the target network device detects the SRS may be understood as: signal quality that is of the first cell and that is indicated by signal quality information of the SRS detected by the first cell of the target network device is greater than or equal to a first threshold. The first threshold may be specified in a protocol, or may be determined by the target network device or the source network device. This is not specifically limited in this embodiment of this disclosure.

It may be understood that, in this embodiment, signal quality information of the first cell may be understood as the signal quality information that is from the SRS of the terminal device and that is received by the first cell of the target network device.

S406. The target network device sends, to the source network device, the signal quality information of the SRS detected by the first cell. Correspondingly, the source network device receives, from the target network device, the signal quality information of the SRS detected by the first cell.

The signal quality information of the SRS detected by the first cell indicates the signal quality information that is from the SRS of the terminal device and that is received by the first cell of the target network device, and signal quality of the SRS is greater than or equal to the first threshold. Alternatively, in this embodiment, because the signal quality information of the first cell may be understood as the signal quality information that is from the SRS of the terminal device and that is received by the first cell of the target network device, the signal quality information of the SRS detected by the first cell may also indicate the signal quality information of the first cell, and the signal quality of the first cell is greater than or equal to the first threshold.

Optionally, when the first cell of the target network device monitors the SRS based on the configuration information of the SRS, and when the signal quality indicated by the signal quality information of the SRS detected by the first cell is less than the first threshold, the first cell of the target network device may ignore the signal quality information, and continue to perform measurement; or when the signal quality indicated by the signal quality information of the SRS detected by the first cell is greater than or equal to the first threshold, the target network device may send the signal quality information of the SRS to the source network device.

Based on this solution, because the source network device sends the configuration information of the SRS of the terminal device to the target network device, the first cell of the target network device can monitor the SRS, and send, to the source network device, the signal quality information of the SRS detected by the first cell, so that the source network device obtains the signal quality information of the first cell, and the source network device can control, based on the signal quality information, the terminal device to perform handover.

Optionally, in an implementation scenario of this embodiment of this disclosure, the signal quality information obtaining method further includes the following operation S407.

S407. The source network device determines the first cell as a target cell based on the signal quality information of the SRS detected by the first cell.

Optionally, based on the related descriptions of operation S405, the source network device may obtain the signal quality information of the first cell based on the signal quality information of the SRS detected by the first cell, to compare signal quality of one or more other neighboring cells of the current serving cell of the terminal device with the signal quality of the first cell. When the signal quality of the first cell is higher than the signal quality of the one or more other neighboring cells, the source network device may determine the first cell as the target cell.

Optionally, the one or more other neighboring cells of the current serving cell of the terminal device may include a cell in an energy-saving state, or may include a cell in a non-energy saving state. For the cell in the energy-saving state in the one or more other neighboring cells, signal quality information of the cell may be obtained by the source network device and another network device that controls the one or more other neighboring cells by performing the method described in operations S401 to S406. For the non-energy saving cell in the one or more other neighboring cells, signal quality information of the cell may be measured by the terminal device and then sent to the source network device after the terminal device measures an SSB of the cell. This is not specifically limited in this embodiment of this disclosure.

Based on this solution, the source network device can determine the target cell based on the signal quality information of the SRS detected by the first cell, so that the source network device determines that the terminal device may be handed over to the first cell.

Optionally, after the source network device determines the first cell as the target cell, the signal quality information obtaining method may further include the following operations.

S408. The source network device sends a first message to the target network device. Correspondingly, the target network device receives the first message from the source network device.

The first message is used to request to hand over the terminal device to the first cell.

Optionally, for example, the first message may be an existing handover request message, or may be a newly defined message. This is not specifically limited in this embodiment of this disclosure.

Optionally, the first message may further include indication information, and the indication information is used to indicate the target network device to send an SSB corresponding to the first cell.

Optionally, after receiving the first message from the source network device, the target network device may determine whether the terminal device is allowed to hand over to the first cell. When determining that the terminal device is allowed to hand over to the first cell, the target network device performs the following operation S409 and operation S411.

S409. The target network device sends a second message to the source network device. Correspondingly, the source network device receives the second message from the target network device. The second message is used to indicate that the terminal device is allowed to hand over to the first cell.

Optionally, the second message may be an existing handover request acknowledgement message, or may be a newly defined message. This is not specifically limited in this embodiment of this disclosure.

Optionally, the second message may include first configuration information, and the first configuration information is used by the terminal device to access the first cell. For example, the first configuration information may include configuration information of the SSB corresponding to the first cell and/or RMSI corresponding to the first cell.

S410. The source network device sends a third message to the terminal device. Correspondingly, the terminal device receives the third message from the source network device.

The third message is used to indicate the terminal device to hand over to the first cell. The third message may include the first configuration information.

S411. The first cell of the target network device sends the SSB. Correspondingly, the terminal device receives the SSB from the first cell of the target network device.

In this embodiment, if the first message does not include the indication information, when the target network device determines that the terminal device is allowed to hand over to the first cell, the first cell of the target network device starts to send the SSB; or if the first message includes the indication information, when the target network device determines that the terminal device is allowed to hand over to the first cell, the first cell of the target network device starts to send the SSB based on the indication information.

It may be understood that, after the first cell of the target network device sends the SSB, a state of the first cell changes from an energy-saving state to a non-energy saving state.

Optionally, after receiving the third message, the terminal device may receive the SSB of the first cell based on the configuration information that is of the SSB of the first cell and that is included in the first configuration information, and then perform random access in the first cell based on the SSB of the first cell, to access the first cell, and to perform subsequent communication with the first cell.

Based on this solution, for one thing, the source network device can control the terminal device to hand over to the first cell, so that the terminal device can hand over to the energy-saving cell that originally does not send the SSB. For another, when the target network device is connected to the source network device through a wired interface, the target network device may send the signal quality information of the first cell to the source network device through the wired interface, so that the source network device performs handover decision. Therefore, the energy-saving cell does not need to send the SSB, and the terminal device does not need to measure the SSB through a wireless interface and does not need to report the signal quality information to the source network device to perform the handover decision. This reduces overheads of air interface resources.

It may be understood that when the target network device is a DU or the target network device includes a CU and a DU, the actions performed/implemented by the first cell of the target network device in operations S401 to S411 may be performed/implemented by the DU that controls the first cell. When the target network device is a CU or the target network device includes a CU and a DU, the actions of interaction between the target network device and the source network device in operations S401 to S411 may be implemented by the CU.

It may be understood that when the source network device is a CU or a DU, or the source network device includes a CU and a DU, the actions of interaction between the source network device and the target network device in operations S401 to S411 may be implemented by the CU, the actions of interaction between the source network device and the terminal device in operations S401 to S411 may be implemented by the CU or the DU, and the actions related to determining of the source network device in operations S401 to S411 may be implemented by the CU.

The processor 201 in the source network device 20 shown in FIG. 3 may invoke disclosure program code stored in the memory 202, to indicate the source network device to perform the actions of the source network device in operations S401 to S411. The processor 301 in the target network device 30 shown in FIG. 3 may invoke disclosure program code stored in the memory 302, to indicate the target network device to perform the actions of the target network device in operations S401 to S411. This is not limited in this embodiment.

Figure 5:
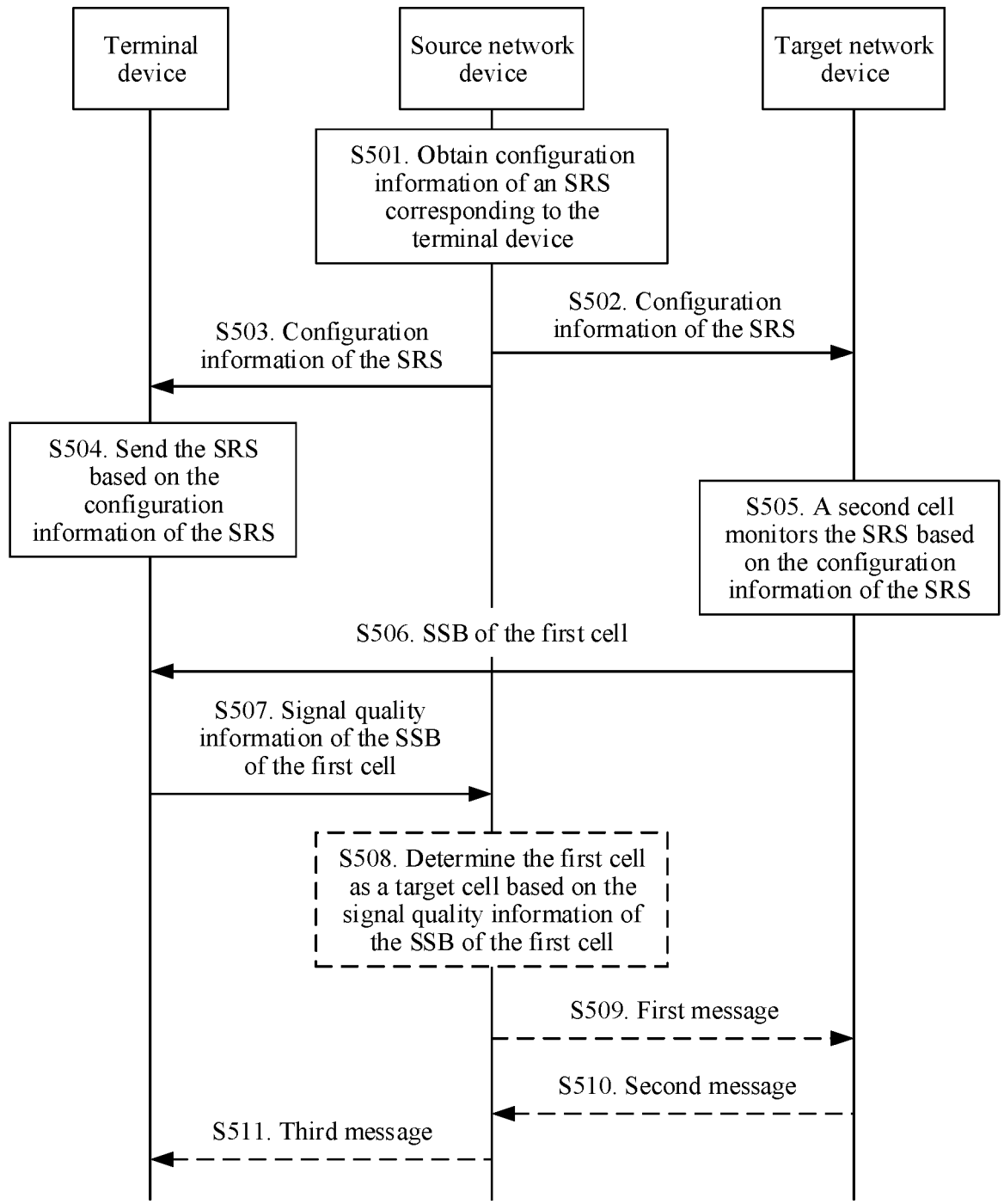
FIG. 5 is a schematic flowchart 2 of a signal quality information obtaining method according to an embodiment of this disclosure.

FIG. 5 shows another signal quality information obtaining method according to an embodiment of this disclosure. The signal quality information obtaining method includes the following operations.

S501 to S504 are the same as the foregoing operations S401 to S404. For related descriptions, refer to the foregoing operations S401 to S404. Details are not described herein again.

S505. A second cell of a target network device monitors an SRS based on configuration information of the SRS.

Optionally, the second cell is any cell controlled by the target network device, and the second cell may be the same as or different from a first cell.

When the second cell of the target network device detects the SRS, the following operation S506 is performed. That the second cell of the target network device detects the SRS may be understood as: signal quality that is of the second cell and that is indicated by signal quality information of the SRS detected by the second cell of the target network device is greater than or equal to a second threshold.

It may be understood that, in this embodiment, signal quality information of the second cell may be understood as the signal quality information that is from the SRS of the terminal device and that is received by the second cell of the target network device.

Optionally, the second threshold may be specified in a protocol, or may be determined by the target network device or the source network device. The second threshold may be the same as or different from a first threshold. This is not specifically limited in this embodiment of this disclosure.

Optionally, the second cell may be the same as or different from the first cell. For example:

In a possible implementation, the second cell is different from the first cell, that is, the second cell and the first cell are different cells, and the second cell is in a non-energy saving state. In other words, before the method provided in this embodiment is performed, the second cell of the target network device sends an SSB. The SSB sent by the second cell is used by the terminal device to synchronize with the second cell and receive information broadcast by the second cell. The SSB sent by the second cell may also be understood as an SSB of the second cell.

For example, the implementation may be applied to a multi-carrier scenario, that is, a carrier of the second cell may be different from a carrier of the first cell. Alternatively, this implementation may be applied to a scenario in which the target network device includes a CU and a plurality of DUs and the first cell and the second cell are controlled by different DUs. For example, the target network device includes a first DU, a second DU, and a CU, the first DU controls the first cell, and the second DU controls the second cell. In this scenario, that the second cell of the target network device detects the SRS may be understood as: The second cell of the second DU detects the SRS. Then, the second DU sends a notification message to the CU; and after receiving the notification message, the CU sends the notification message to the first DU, to indicate the first DU to perform the following operation S506. In this case, operation S506 is performed by the first DU. Alternatively, this implementation may be applied to a scenario in which the target network device includes a plurality of transmission reception points (TRP) and the first cell and the second cell are controlled by different TRPs. For example, the target network device includes a first TRP and a second TRP, the first TRP controls the first cell, and the second TRP controls the second cell. In this scenario, that the second cell of the target network device detects the SRS may be understood as: The second cell of the second TRP detects the SRS. Then, the second TRP sends a notification message to the first TRP, to indicate the first TRP to perform the following operation S506. In this case, operation S506 is performed by the first TRP.

It may be understood that the implementation may alternatively be applied to another scenario. An applicable scenario of the implementation is not specifically limited in this embodiment of this disclosure.

In another possible implementation, the second cell is the same as the first cell, that is, the second cell and the first cell are a same cell. In other words, in this implementation, after detecting the SRS, the first cell of the target network device performs the following operation S506.

Optionally, this implementation may also be applied to the multi-carrier scenario and the scenario in which the target network device includes a plurality of DUs or a plurality of TRPs, and may alternatively be applied to another scenario. An applicable scenario of the implementation is not specifically limited in this embodiment of this disclosure.

S506. The first cell of the target network device sends the SSB. Correspondingly, the terminal device receives the SSB from the first cell of the target network device.

In other words, in this embodiment, when the second cell of the target network device detects the SRS sent by the terminal device, the first cell of the target network device starts to send the SSB, or when the second cell of the target network device detects the SRS sent by the terminal device, a state of the first cell changes from an energy-saving state to a non-energy saving state.

Optionally, when receiving the SSB of the first cell, the terminal device may measure the SSB, to obtain signal quality information of the SSB of the first cell. The signal quality information of the SSB of the first cell indicates signal quality information of the first cell.

It may be understood that, in this embodiment, the signal quality information of the first cell may be understood as the signal quality information that is from the SSB of the first cell of the target network device and that is received by the terminal device.

S507. The terminal device sends the signal quality information of the SSB of the first cell to the source network device. Correspondingly, the source network device receives the signal quality information of the SSB of the first cell from the terminal device.

Based on this solution, because the source network device sends the configuration information of the SRS of the terminal device to the target network device, the second cell of the target network device can monitor the SRS, and send the SSB of the first cell when the second cell detects the SRS, so that the terminal device can obtain the signal quality information of the SSB of the first cell, and report the signal quality information of the SSB of the first cell to the source network device. Therefore, the source network device can obtain the signal quality information of the first cell, and perform handover based on the signal quality information of the first cell.

Optionally, in an implementation scenario of this embodiment of this disclosure, the signal quality information obtaining method further includes the following operation S508.

S508. The source network device determines the first cell as a target cell based on the signal quality information of the SSB of the first cell.

Optionally, the source network device may determine the signal quality information of the first cell based on the signal quality information of the SSB of the first cell, to compare signal quality of one or more other neighboring cells of a current serving cell of the terminal device with signal quality of the first cell. When the signal quality of the first cell is the best, the source network device determines the first cell as the target cell.

Optionally, a method for the source network device to obtain signal quality information of the one or more other neighboring cells of the current serving cell of the terminal device is not specifically limited in this embodiment of this disclosure.

Based on this solution, for one thing, the source network device can determine the target cell based on the signal quality information of the SSB of the first cell, so that the source network device determines that the terminal device may be handed over to the first cell. For another, after the second cell detects the SRS, the energy-saving cell can send the SSB, so that the terminal device can report a measurement result to the source network device by using an existing standard measurement and reporting mechanism. Therefore, the source network device can perform handover decision. This is better compatible with an existing standard procedure.

Optionally, after the source network device determines the first cell as the target cell, the signal quality information obtaining method may further include operations S509 to S511. Operations S509 to S511 are similar to the foregoing operations S408 to S410, and a difference lies in that a first message does not include foregoing indication information. For details, refer to the related descriptions of the foregoing operations S408 to S410. Details are not described herein again.

It may be understood that when the target network device is a DU or the target network device includes a CU and a DU, the actions implemented by the first cell or the second cell of the target network device in operations S501 to S511 may be respectively implemented by the DU that controls the first cell and the DU that controls the second cell. When the target network device is a CU or the target network device includes a CU and a DU, the actions of interaction between the target network device and the source network device in operations S501 to S511 may be implemented by the CU.

It may be understood that when the source network device is a CU or a DU, or the source network device includes a CU and a DU, the actions of interaction between the source network device and the target network device in operations S501 to S511 may be implemented by the CU, the actions of interaction between the source network device and the terminal device in operations S501 to S511 may be implemented by the CU or the DU, and the actions related to determining of the source network device in operations S501 to S511 may be implemented by the CU.

The processor 201 in the source network device 20 shown in FIG. 3 may invoke disclosure program code stored in the memory 202, to indicate the source network device to perform the actions of the source network device in operations S501 to S511. The processor 301 in the target network device 30 shown in FIG. 3 may invoke disclosure program code stored in the memory 302, to indicate the target network device to perform the actions of the target network device in operations S501 to S511. This is not limited in this embodiment.

Figure 6:
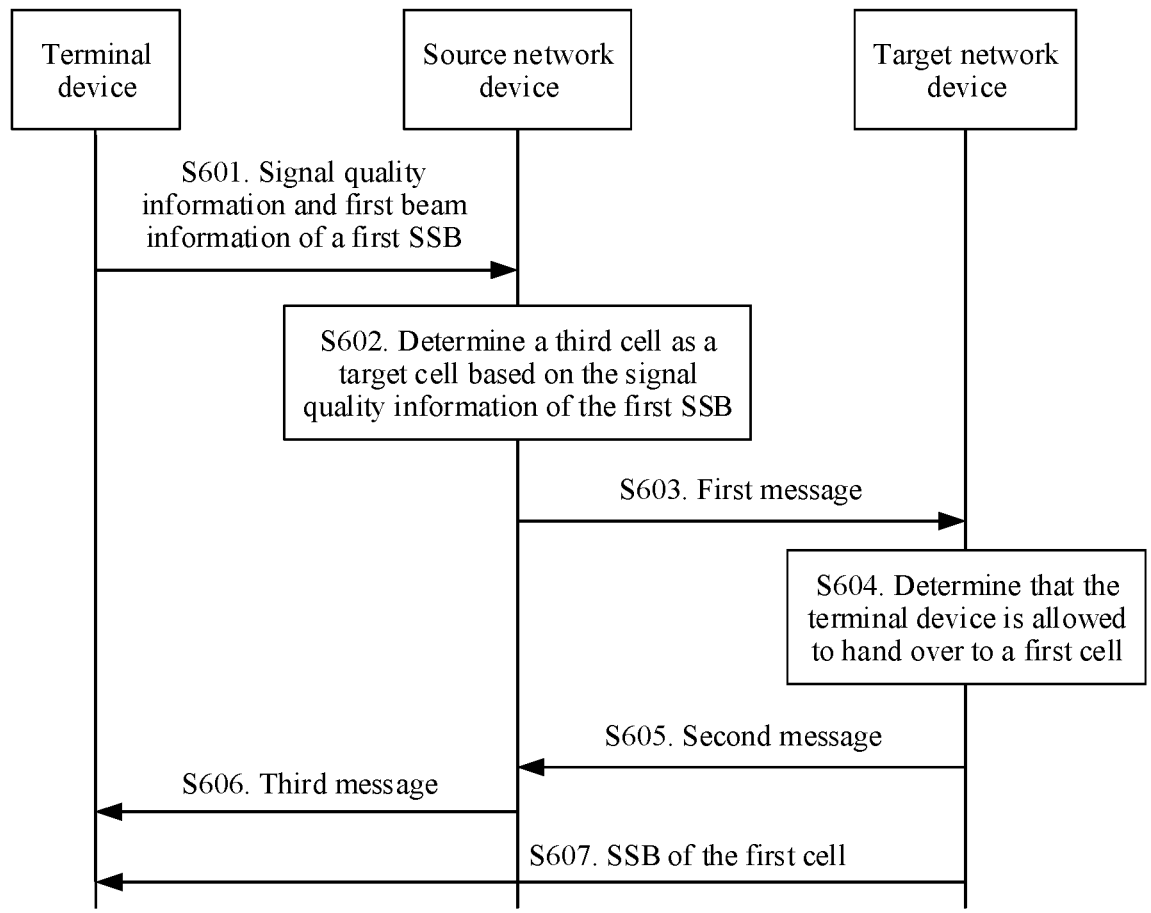
FIG. 6 is a schematic flowchart 3 of a signal quality information obtaining method according to an embodiment of this disclosure.

FIG. 6 shows still another signal quality information obtaining method according to an embodiment of this disclosure. The signal quality information obtaining method includes the following operations.

S601. A terminal device sends signal quality information and first beam information of a first SSB of a third cell to a source network device. Correspondingly, the source network device receives the signal quality information and the first beam information of the first SSB of the third cell from the terminal device.

The third cell is a cell controlled by a target network device. The third cell is different from a first cell, that is, the third cell and the first cell are different cells, and the third cell is in a non-energy saving state. In other words, before the method provided in this embodiment is performed, the third cell of the target network device sends an SSB. The SSB sent by the third cell is used by the terminal device to synchronize with the third cell and receive information broadcast by the third cell. The SSB sent by the third cell may also be understood as an SSB of the third cell.

Optionally, to implement coverage in the third cell in a plurality of directions, the SSB sent by the third cell may include N SSBs, each of the N SSBs includes related information of the third cell, and the N SSBs may be sent by using N beams in different directions. The N SSBs are in one-to-one correspondence with the N beams in the different directions, that is, a beam in one direction is used to carry one SSB. Correspondingly, the terminal device may measure the N SSBs of the third cell on the N beams in the different directions, to obtain signal quality information of the N SSBs of the third cell and beam information that is in one-to-one correspondence with the signal quality information of the N SSBs. A beam indicated by beam information corresponding to signal quality information of an SSB of the third cell is used to carry the SSB.

N is a positive integer greater than 1, the first SSB of the third cell includes one or more of the N SSBs of the third cell, a beam indicated by the first beam information is used to carry the first SSB of the third cell, and signal quality information of an SSB of the third cell indicates signal quality information of the third cell in a beam direction of the SSB.

It may be understood that, in this embodiment, the signal quality information of the third cell in a beam direction of an SSB may be understood as signal quality information that is from the third cell of the target network device in the beam direction of the SSB and that is received by the terminal device.

Generally, when the first SSB includes only one SSB, signal quality indicated by signal quality information of the SSB may be signal quality of an SSB with highest signal quality in the N SSBs.

For example, if the SSBs sent by the third cell of the target network device include an SSB 1, an SSB 2, an SSB 3, and an SSB 4, the terminal device may separately obtain signal quality information and beam information of the SSB 1, the SSB 2, the SSB 3, and the SSB 4. A beam indicated by the beam information corresponding to the SSB 1 is a beam used to carry the SSB 1, a beam indicated by the beam information corresponding to the SSB 2 is a beam used to carry the SSB 2, a beam indicated by the beam information corresponding to the SSB 3 is a beam used to carry the SSB 3, and a beam indicated by the beam information corresponding to the SSB 4 is a beam used to carry the SSB 4. Correspondingly, the signal quality information that is of the first SSB of the third cell and that is sent by the terminal device to the source network device may be the signal quality information of one or more of the SSB 1, the SSB 2, the SSB 3, or the SSB 4.

S602. The source network device determines the third cell as a target cell based on the signal quality information of the first SSB of the third cell.

Optionally, the source network device may learn of signal quality information of the third cell based on the signal quality information of the first SSB, to compare signal quality of one or more other neighboring cells of a current serving cell of the terminal device with signal quality of the third cell. When the signal quality of the third cell is higher than the signal quality of the one or more other neighboring cells, the source network device determines the third cell as the target cell.

S603. The source network device sends a first message to the target network device. Correspondingly, the target network device receives the first message from the source network device.

The first message includes the signal quality information and the first beam information of the first SSB of the third cell.

Optionally, the first message may be used to request to hand over the terminal device to the third cell. For example, the first message may be an existing handover request message, or may be a newly defined message. This is not specifically limited in this embodiment of this disclosure.

S604. The target network device determines that the terminal device is allowed to hand over to the first cell.

The target network device may determine, based on the signal quality information and the first beam information of the first SSB of the third cell, that the terminal device is allowed to hand over to the first cell. An overlapping part may exist between a coverage area of the first cell and a coverage area of the third cell.

It may be understood that, in this embodiment of this disclosure, that an overlapping part may exist between a coverage area of the first cell and a coverage area of the third cell may include one or more of the following cases: a part of the coverage area of the first cell overlaps a part of the coverage area of the third cell; or all of the coverage area of the first cell overlaps a part of the coverage area of the third cell, in other words, the coverage area of the third cell includes the coverage area of the first cell; or a part of the coverage area of the first cell overlaps all of the coverage area of the third cell, in other words, the coverage area of the first cell includes the coverage area of the third cell.

Optionally, that the target network device determines, based on the signal quality information and the first beam information of the first SSB of the third cell, that the terminal device is allowed to hand over to the first cell may include: The target network device estimates, based on the signal quality information and the first beam information of the first SSB of the third cell, a location of the terminal device; and then determines, based on the location of the terminal device, that the terminal device is allowed to hand over to the first cell.

Optionally, because the first cell of the target network device does not send an SSB, the terminal device cannot obtain signal quality information of the SSB of the first cell, and cannot report the signal quality information of the SSB to the source network device. Consequently, the source network device cannot determine the first cell as the target cell. The target network device may learn of related information of the first cell. For example, the overlapping part exists between the coverage area of the first cell and the coverage area of the third cell. Therefore, after estimating the location of the terminal device, the target network device may determine, based on the location, that the terminal device is allowed to hand over to the first cell.

Optionally, that the target network device determines, based on the location of the terminal device, that the terminal device is allowed to hand over to the first cell may include: when the target network device includes a first TRP and a third TRP, the first TRP controls the first cell, and the third TRP controls the third cell, the target network device determines that a first distance is less than a second distance, where the first distance is a distance between the location of the terminal device and the first TRP, and the second distance is a distance between the terminal device and the third TRP; may include: when the target network device includes a first TRP and a third TRP, the first TRP controls the first cell, and the third TRP controls the third cell, the target network device determines that a first distance is greater than a second distance but load of the third cell is greater than load of the first cell; may include: the target network device determines that at the location of the terminal device, quality of a channel between the terminal device and the first cell is greater than quality of a channel between the terminal device and the third cell; or may include: the target network device determines that the first cell at the location of the terminal device is a high-frequency cell, and that the third cell at the location of the terminal device is a low-frequency cell.

S605. The target network device sends a second message to the source network device. Correspondingly, the source network device receives the second message from the target network device.

The second message is used to indicate that the terminal device is allowed to hand over to the first cell.

Optionally, the second message may be an existing handover request acknowledgement, or may be a newly defined message. This is not specifically limited in this embodiment of this disclosure.

Optionally, the second message includes an identifier of the first cell and/or configuration information of an SSB of the first cell. The identifier of the first cell and/or the configuration information of the SSB of the first cell may be used by the terminal device to access the first cell.

S606. The source network device sends a third message to the terminal device. Correspondingly, the terminal device receives the third message from the source network device.

The third message is used to indicate the terminal device to hand over to the first cell. The third message may include the identifier of the first cell and/or the configuration information of the SSB of the first cell.

S607. The first cell of the target network device sends the SSB. Correspondingly, the terminal device receives the SSB from the first cell of the target network device.

In this embodiment, when the target network device determines that the terminal device is allowed to hand over to the first cell, the first cell of the target network device starts to send the SSB, so that the terminal device can access the first cell based on the SSB of the first cell. In other words, in this embodiment, when the target network device determines that the terminal device is allowed to hand over to the first cell, the first cell of the target network device starts to send the SSB, or when the target network device determines that the terminal device is allowed to hand over to the first cell, a state of the first cell changes from an energy-saving state to a non-energy saving state.

Optionally, after receiving the third message, the terminal device may receive the SSB of the first cell based on the identifier of the first cell and/or the configuration information of the SSB of the first cell, and perform random access in the first cell based on the SSB of the first cell, to perform subsequent communication with the first cell.

Based on this solution, the target network device can determine, based on the signal quality information and the beam information that are of the SSB of the third cell and that are obtained by the terminal device through measurement, that the terminal device is allowed to hand over to the first cell, and indicate, to the source network device, that the terminal device is allowed to hand over to the first cell, so that the source network device can control the terminal device to hand over to the first cell.

Optionally, in another implementation scenario of this embodiment of this disclosure, after the target network device receives the first message from the source network device, a plurality of cells controlled by the target network device may send SSBs, so that the terminal device measures the SSBs of the plurality of cells, and selects one of the cells for access. In other words, in this implementation, the terminal device may not hand over to the first cell based on an indication of the source network device. Before receiving the first message from the source network device, the target network device does not send the SSBs of the plurality of cells. In other words, the target network device sends the SSBs of the plurality of cells based on triggering of the first message.

It may be understood that when the target network device is a DU or the target network device includes a CU and a DU, the actions implemented by the first cell or the third cell of the target network device in operations S601 to S607 may be respectively implemented by the DU that controls the first cell and the DU that controls the third cell. When the target network device is a CU or the target network device includes a CU and a DU, the actions of interaction between the target network device and the source network device in operations S601 to S607 may be implemented by the CU.

It may be understood that when the source network device is a CU or a DU, or the source network device includes a CU and a DU, the actions of interaction between the source network device and the target network device in operations S601 to S607 may be implemented by the CU, the actions of interaction between the source network device and the terminal device in operations S601 to S607 may be implemented by the CU or the DU, and the actions related to determining of the source network device in operations S601 to S607 may be implemented by the CU.

The processor 201 in the source network device 20 shown in FIG. 3 may invoke disclosure program code stored in the memory 202, to indicate the source network device to perform the actions of the source network device in operations S601 to S607. The processor 301 in the target network device 30 shown in FIG. 3 may invoke disclosure program code stored in the memory 302, to indicate the target network device to perform the actions of the target network device in operations S601 to S607. This is not limited in this embodiment.

It may be understood that in embodiments of this disclosure, the terminal device and/or the network device (including the source network device or the target network device) may perform some or all of the operations in embodiments of this disclosure. These operations or operations are merely examples. In embodiments of this disclosure, other operations or variations of various operations may be further performed. In addition, the operations may be performed in a sequence different from a sequence presented in embodiments of this disclosure, and not all the operations in embodiments of this disclosure are necessarily to be performed.

In embodiments of this disclosure, unless otherwise stated or there is a logic conflict, terms and/or descriptions between different embodiments are consistent and may be mutually referenced, and technical features in different embodiments may be combined based on an internal logical relationship thereof, to form a new embodiment.

It may be understood that, in the foregoing embodiments, the methods and/or operations implemented by the source network device may also be implemented by a component (for example, a chip or a circuit) that can be used in the source network device, and the methods and/or operations implemented by the target network device may also be implemented by a component (for example, a chip or a circuit) that can be used in the target network device.

The foregoing mainly describes the solutions provided in embodiments of this disclosure from the perspective of interaction between network elements. Correspondingly, an embodiment of this disclosure further provides a communication apparatus, and the communication apparatus is configured to implement the foregoing methods. The communication apparatus may be the source network device in the foregoing method embodiments, an apparatus including the source network device, or a component that can be used in the source network device. Alternatively, the communication apparatus may be the target network device in the foregoing method embodiments, an apparatus including the target network device, or a component that may be used in the target network device. It may be understood that, to implement the foregoing functions, the communication apparatus includes a hardware structure and/or a software module for performing each corresponding function. A person skilled in the art should be easily aware that, with reference to units and algorithm operations in the examples described in embodiments disclosed in this specification, this disclosure can be implemented in a form of hardware or a combination of hardware and computer software. Whether a function is performed by hardware or hardware driven by computer software depends on particular disclosures and design constraints of the technical solutions. A person skilled in the art may use different methods to implement the described functions for each particular disclosure, but it should not be considered that the implementation goes beyond the scope of this disclosure.

In embodiments of this disclosure, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in embodiments of this disclosure, module division is an example, and is merely logical function division. In actual implementation, another division manner may be used.

Figure 7:
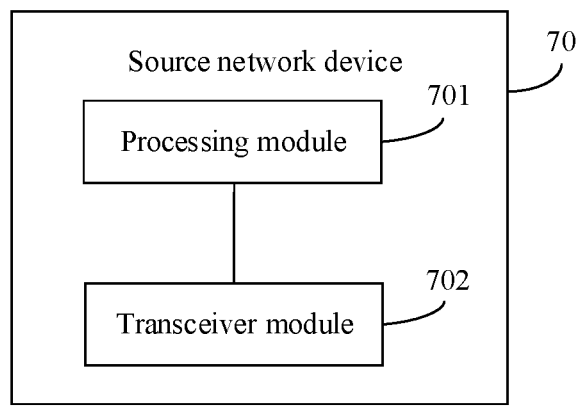
FIG. 7 is a schematic diagram of a structure of another source network device according to an embodiment of this disclosure.

For example, the communication apparatus is the source network device in the foregoing method embodiments. FIG. 7 is a schematic diagram of a structure of a source network device 70. The source network device 70 includes a processing module 701 and a transceiver module 702. The transceiver module 702 may also be referred to as a transceiver unit, and is configured to implement a sending and/or receiving function. For example, the transceiver module may be a transceiver circuit, a transceiver, or a communication interface.

In a possible implementation, the processing module 701 is configured to obtain configuration information of a sounding reference signal (SRS) of a terminal device; a transceiver module 702 is configured to send the configuration information of the SRS to a target network device and the terminal device, where the configuration information of the SRS is used to configure a resource used by the terminal device to send the SRS, and is used to configure the target network device to monitor the SRS on the resource, so that the terminal device sends the SRS; and the transceiver module 702 is further configured to receive signal quality information of the SRS detected by a first cell of the target network device from the target network device, where the first cell is a cell controlled by the target network device, the first cell is an energy-saving cell, and the energy-saving cell is a cell that does not send an SSB.

Optionally, the processing module 701 is further configured to determine the first cell as a target cell based on the signal quality information of the SRS detected by the first cell.

Optionally, the transceiver module 702 is further configured to send a first message to the target network device, where the first message is used to request to hand over the terminal device to the first cell. The transceiver module 702 is further configured to receive a second message from the target network device, where the second message is used to indicate that the terminal device is allowed to hand over to the first cell.

In another possible implementation, the processing module 701 is configured to obtain configuration information of a sounding reference signal (SRS) of a terminal device; the transceiver module 702 is configured to send the configuration information of the SRS to a target network device and the terminal device, where the configuration information of the SRS is used to configure a resource used by the terminal device to send the SRS, and is used to configure the target network device to monitor the SRS on the resource; and the transceiver module 702 is further configured to receive signal quality information that is of a synchronization signal/physical broadcast channel block (SSB) of a first cell and that is from the terminal device, where the first cell is a cell controlled by the target network device, the first cell is an energy-saving cell, and the energy-saving cell is a cell that does not send an SSB.

Optionally, the processing module 701 is further configured to determine the first cell as a target cell based on the signal quality information of the SSB of the first cell.

Optionally, the transceiver module 702 is further configured to send a first message to the target network device, where the first message is used to request to hand over the terminal device to the first cell. The transceiver module 702 is further configured to receive a second message from the target network device, where the second message is used to indicate that the terminal device is allowed to hand over to the first cell.

In still another possible implementation, the transceiver module 702 is configured to receive signal quality information and first beam information that are of a first synchronization signal/physical broadcast channel block (SSB) of a third cell and that are from a terminal device, where the third cell is a cell controlled by a target network device, and a beam indicated by the first beam information is used to carry the first SSB of the third cell; the processing module 701 is configured to determine the third cell as a target cell based on the signal quality information of the first SSB of the third cell; the transceiver module 702 is further configured to send a first message to the target network device, where the first message includes the signal quality information and the first beam information of the first SSB of the third cell; and the transceiver module 702 is further configured to receive a second message from the target network device, where the second message is used to indicate that the terminal device is allowed to hand over to the first cell, the first cell is a cell controlled by the target network device, and an overlapping part exists between a coverage area of the first cell and a coverage area of the third cell.

All related content of the operations in the foregoing method embodiments may be cited in function descriptions of corresponding functional modules. Details are not described herein again.

In this embodiment, the source network device 70 is presented in a form of functional modules obtained through division in an integrated manner. The "module" herein may be a specific ASIC, a circuit, a processor that executes one or more software or firmware programs, a memory, an integrated logic circuit, and/or another component that can provide the foregoing functions. In a simple embodiment, a person skilled in the art may figure out that the source network device 70 may be in a form of the source network device 20 shown in FIG. 3.

For example, the processor 201 in the source network device 20 shown in FIG. 3 may invoke computer-executable instructions stored in the memory 202, so that the source network device 70 performs a signal quality information obtaining method in the foregoing method embodiments.

Specifically, the processor 201 in the source network device 20 shown in FIG. 3 may invoke the computer-executable instructions stored in the memory 202, to implement functions/implementation processes of the processing module 701 and the transceiver module 702 in FIG. 7. Alternatively, the processor 201 in the source network device 20 shown in FIG. 3 may invoke the computer-executable instructions stored in the memory 202, to implement a function/an implementation process of the processing module 701 in FIG. 7, and the transceiver 203 in the source network device 20 shown in FIG. 3 may implement a function/an implementation process of the transceiver module 702 in FIG. 7.

The source network device 70 provided in this embodiment can perform the foregoing signal quality information obtaining methods. Therefore, for technical effects that can be achieved by the source network device, refer to the foregoing method embodiments. Details are not described herein again.

Figure 8:
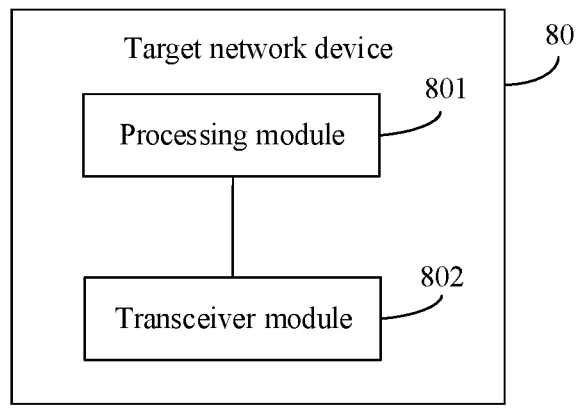
FIG. 8 is a schematic diagram of a structure of another target network device according to an embodiment of this disclosure.

Alternatively, for example, the communication apparatus is the target network device in the foregoing method embodiments. FIG. 8 is a schematic diagram of a structure of a target network device 80. The target network device 80 includes a processing module 801 and a transceiver module 802. The transceiver module 802 may also be referred to as a transceiver unit, and is configured to implement a sending and/or receiving function. For example, the transceiver module may be a transceiver circuit, a transceiver, or a communication interface.

In a possible implementation, the transceiver module 802 is configured to receive configuration information of a sounding reference signal (SRS) of a terminal device from a source network device; the processing module 801 is used by a first cell of the target network device to monitor the SRS based on the configuration information of the SRS, where the first cell is a cell controlled by the target network device, the first cell is an energy-saving cell, and the energy-saving cell is a cell that does not send an SSB; and the transceiver module 802 is further configured to send, to the source network device, signal quality information of the SRS detected by the first cell.

Optionally, the transceiver module 802 is further configured to receive a first message from the source network device, where the first message is used to request to hand over the terminal device to the first cell; and the transceiver module 802 is further configured to send a second message to the source network device, where the second message is used to indicate that the terminal device is allowed to hand over to the first cell.

Optionally, the transceiver module 802 is further used by the first cell of the target network device to send a synchronization signal/physical broadcast channel block (SSB).

In another possible implementation, the transceiver module 802 is configured to receive configuration information of a sounding reference signal (SRS) of a terminal device from a source network device; the processing module 801 is used by a second cell of the target network device to monitor the SRS based on the configuration information of the SRS; and when signal quality that is of the second cell and that is indicated by signal quality information of the SRS detected by the second cell of the target network device is greater than or equal to a second threshold, the transceiver module 802 is further used by a first cell of the target network device to send a synchronization signal/physical broadcast channel block (SSB), where the first cell is a cell controlled by the target network device, the first cell is an energy-saving cell, and the energy-saving cell is a cell that does not send an SSB.

Optionally, the transceiver module 802 is further configured to receive a first message from the source network device, where the first message is used to request to hand over the terminal device to the first cell; and the transceiver module 802 is further configured to send a second message to the source network device, where the second message is used to indicate that the terminal device is allowed to hand over to the first cell.

In still another possible implementation, the transceiver module 802 is configured to receive a first message from a source network device, where the first message includes signal quality information and first beam information of a first synchronization signal/physical broadcast channel block (SSB) of a third cell, the third cell is a cell controlled by the target network device, and a beam indicated by the first beam information is used to carry the first SSB of the third cell; the processing module 801 is configured to determine, based on the signal quality information and the first beam information of the first SSB of the third cell, that a terminal device is allowed to hand over to a first cell, where the first cell is a cell controlled by the target network device, and an overlapping part exists between a coverage area of the first cell and a coverage area of the third cell; and the transceiver module 802 is further configured to send a second message to the source network device, where the second message is used to indicate that the terminal device is allowed to hand over to the first cell.

Optionally, that the processing module 801 is configured to determine, based on the signal quality information and the first beam information of the first SSB of the third cell, that a terminal device is allowed to hand over to a first cell includes: The processing module 801 is configured to estimate, based on the signal quality information and the first beam information of the first SSB of the third cell, a location of the terminal device; and the processing module 801 is further configured to determine, based on the location of the terminal device, that the terminal device is allowed to hand over to the first cell.

Optionally, the transceiver module 802 is further used by the first cell of the target network device to send a synchronization signal/physical broadcast channel block (SSB).

All related content of the operations in the foregoing method embodiments may be cited in function descriptions of corresponding functional modules. Details are not described herein again.

In this embodiment, the target network device 80 is presented in a form of functional modules obtained through division in an integrated manner. The "module" herein may be a specific ASIC, a circuit, a processor that executes one or more software or firmware programs, a memory, an integrated logic circuit, and/or another component that can provide the foregoing functions. In a simple embodiment, a person skilled in the art may figure out that the target network device 80 may be in a form of the target network device 30 shown in FIG. 3.

For example, the processor 301 in the target network device 30 shown in FIG. 3 may invoke computer-executable instructions stored in the memory 302, so that the target network device 80 performs a signal quality information obtaining method in the foregoing method embodiments.

Specifically, the processor 301 in the target network device 30 shown in FIG. 3 may invoke the computer-executable instructions stored in the memory 302, to implement functions/implementation processes of the processing module 801 and the transceiver module 802 in FIG. 8. Alternatively, the processor 301 in the target network device 30 shown in FIG. 3 may invoke the computer-executable instructions stored in the memory 302, to implement a function/an implementation process of the processing module 801 in FIG. 8, and the transceiver 303 in the target network device 30 shown in FIG. 3 may implement a function/an implementation process of the transceiver module 802 in FIG. 8.

The target network device 80 provided in this embodiment can perform the foregoing signal quality information obtaining methods. Therefore, for technical effects that can be achieved by the target network device, refer to the foregoing method embodiments. Details are not described herein again.

Optionally, an embodiment of this disclosure further provides a communication apparatus (where for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and data. The processor may invoke program code stored in the memory, to indicate the communication apparatus to perform the method in any one of the foregoing method embodiments. Certainly, the memory may not be in the communication apparatus. In another possible design, the communication apparatus further includes an interface circuit. The interface circuit is a code/data read/write interface circuit, and the interface circuit is configured to: receive computer-executable instructions (where the computer-executable instructions are stored in a memory, and may be directly read from the memory or may be read through another component), and transmit the computer-executable instructions to the processor. When the communication apparatus is a chip system, the communication apparatus may include a chip, or may include the chip and another discrete component. This is not specifically limited in this embodiment of this disclosure.

All or some of the foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer instructions are loaded and executed on a computer, all or some of the procedures or functions according to embodiments of this disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)). In this embodiment of this disclosure, the computer may include the apparatuses described above.

Although this disclosure is described with reference to embodiments, in a process of implementing this disclosure that claims protection, a person skilled in the art may understand and implement another variation of the disclosed embodiments by viewing the accompanying drawings, disclosed content, and appended claims. In the claims, "comprising" does not exclude another component or another operation, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

Although this disclosure is described with reference to specific features and embodiments thereof, it is clear that various modifications and combinations may be made to them without departing from the scope of this disclosure. Correspondingly, the specification and accompanying drawings are merely example descriptions of this disclosure defined by the appended claims, and are considered as any of or all modifications, variations, combinations or equivalents that cover the scope of this disclosure. It is clear that a person skilled in the art can make various modifications and variations to this disclosure without departing from the spirit and scope of this disclosure. This disclosure is intended to cover these modifications and variations of this disclosure provided that they fall within the scope of the claims of this disclosure and their equivalent technologies.

What is claimed is:

1. A source network device, comprising:
a transceiver;
at least one processor; and
one or more memories coupled to the at least one processor and storing programming instructions for execution by the at least one processor to cause the source network device to:
obtain configuration information of a sounding reference signal (SRS) of a terminal device;
send the configuration information of the SRS to a target network device and the terminal device, wherein the configuration information of the SRS is for configuring a resource used by the terminal device to send the SRS, and is for configuring the target network device to monitor the SRS on the resource;
receive signal quality information of the SRS detected by a first cell of the target network device from the target network device, wherein the first cell is a cell controlled by the target network device, the first cell is in an energy-saving state that is configured not to send a synchronization signal/physical broadcast channel block (SSB); and
send a first message to the target network device, wherein the first message requests to hand over the terminal device to the first cell and the first message comprises indication information to indicate the target network device to send an SSB corresponding to the first cell.

2. The source network device according to claim 1, wherein the programming instructions further cause the source network device to:
determine the first cell as a target cell based on the signal quality information of the SRS detected by the first cell.

3. The source network device according to claim 2, wherein the programming instructions further cause the source network device to:
receive a second message from the target network device, wherein the second message indicates that the terminal device is allowed to hand over to the first cell.

4. The source network device according to claim 3, wherein the first message is a handover request message.

5. The source network device according to claim 3, wherein the second message is a handover request acknowledgment message.

6. The source network device according to claim 1, wherein the source network device is a next-generation evolved base station (ng-eNB) or a next-generation base station (gNB).

7. The source network device according to claim 1, wherein the source network device is a centralized unit (CU).

8. A target network device, comprising:
a transceiver;
at least one processor; and
one or more memories coupled to the at least one processor and storing programming instructions for execution by the at least one processor to cause the target network device to:
receive configuration information of a sounding reference signal (SRS) of a terminal device from a source network device;
to monitor the SRS based on the configuration information of the SRS by a first cell of the target network device, wherein the first cell is a cell controlled by the target network device, the first cell is in an energy-saving state that is configured not to send a synchronization signal/physical broadcast channel block (SSB);
send, to the source network device, signal quality information of the SRS detected by the first cell; and
receive a first message from the source network device, wherein the first message requests to hand over the terminal device to the first cell and the first message comprises indication information to indicate the target network device to send an SSB corresponding to the first cell.

9. The target network device according to claim 8, wherein the programming instructions further cause the target network device to:
send a second message to the source network device, wherein the second message indicates that the terminal device is allowed to hand over to the first cell.

10. The target network device according to claim 9, wherein the first message is a handover request message.

11. The target network device according to claim 9, wherein the second message is a handover request acknowledgment message.

12. The target network device according to claim 9, wherein the programming instructions further cause the target network device to:
send an SSB by the first cell of the target network device.

13. The target network device according to claim 8, wherein the target network device is a next-generation base station (gNB).

14. The target network device according to claim 8, wherein the target network device is a centralized unit (CU) or a distributed unit (DU).

15. A system comprising a source network device and a target network device, wherein
the source network device, comprising:
a first transceiver;
at least one first processor; and
one or more first memories coupled to the at least one first processor and storing first programming instructions for execution by the at least one first processor to cause the source network device to:
obtain configuration information of a sounding reference signal (SRS) of a terminal device;
send the configuration information of the SRS to the target network device and the terminal device, wherein the configuration information of the SRS is for configuring a resource used by the terminal device to send the SRS, and is for configuring the target network device to monitor the SRS on the resource;
receive signal quality information of the SRS detected by a first cell of the target network device from the target network device, wherein the first cell is a cell controlled by the target network device, the first cell is in an energy-saving state that is configured not to send a synchronization signal/physical broadcast channel block (SSB); and
send a first message to the target network device, wherein the first message requests to hand over the terminal device to the first cell and the first message comprises indication information to indicate the target network device to send an SSB corresponding to the first cell; and wherein
the target network device, comprising:
a second transceiver;
at least one second processor; and
one or more second memories coupled to the at least one second processor and storing second programming instructions for execution by the at least one second processor to cause the target network device to:
receive configuration information of the SRS of the terminal device from the source network device;
to monitor the SRS based on the configuration information of the SRS by the first cell of the target network device while the first cell is in the energy-saving state; and
send, to the source network device, signal quality information of the SRS detected by the first cell.

16. The system according to claim 15, wherein the first programming instructions further cause the source network device to:
determine the first cell as a target cell based on the signal quality information of the SRS detected by the first cell.

17. The system according to claim 16, wherein the first programming instructions further cause the source network device to:
receive a second message from the target network device, wherein the second message indicates that the terminal device is allowed to hand over to the first cell.

18. The system according to claim 17, wherein the first message is a handover request message.

19. The system according to claim 17, wherein the second message is a handover request acknowledgment message.

20. The system according to claim 15, wherein the source network device is a next-generation evolved base station (ng-eNB) or a next-generation base station (gNB).

* * * * *